(12) United States Patent
Lai

(10) Patent No.: US 6,674,780 B1
(45) Date of Patent: Jan. 6, 2004

(54) GAS DRAWING/REFILLING AND SEALING STRUCTURE FOR GAS LASER

(75) Inventor: Jin-Sheng Lai, Hsi Xhih (TW)

(73) Assignee: Great Computer Corp., Taipei Hsien (TW)

( * ) Notice: Subject to any disclaimer, the term of this patent is extended or adjusted under 35 U.S.C. 154(b) by 0 days.

(21) Appl. No.: 10/352,951

(22) Filed: Jan. 29, 2003

(51) Int. Cl.[7] .................................................. H01S 3/22
(52) U.S. Cl. .............................. 372/59; 372/61; 372/65; 372/58
(58) Field of Search .............................. 372/59, 65, 61, 372/58

(56) References Cited

U.S. PATENT DOCUMENTS 5,260,961 A * 11/1993 Zhou et al. .................... 372/57
5,867,517 A * 2/1999 Sukhman et al. .............. 372/58

* cited by examiner

Primary Examiner—Leon Scott, Jr.
(74) Attorney, Agent, or Firm—Dennison, Schultz & Dougherty

(57) ABSTRACT

A gas drawing/refilling and sealing structure for a laser gas storage container of the present invention includes a sealed container and a blocking member, wherein the body of the container is provided with a gas passage having a gas inlet end and a blocking end. The gas passage is further provided with a communicating section to make connection of the gas passage to the container. The blocking member is mounted on the blocking end, gas is drawn out of or injected into the container via the gas inlet end when the gas inlet end is opened; the gas is cut off when the gas inlet end is closed, and the container is sealed at the same time. Thereby, manufacturing and test of the laser equipment can be more convenient, and the superiority of products can be increased.

7 Claims, 4 Drawing Sheets

GAS DRAWING/REFILLING AND SEALING STRUCTURE FOR GAS LASER

BACKGROUND OF THE INVENTION

1. Field of the Invention

The present invention is related to a gas drawing/refilling and sealing structure for a gas laser, and especially to a gas drawing/refilling and sealing structure for a gas laser suiting gas drawing/refilling equipment used in laser processing, of which the structure is composed of simplified elements to save working hours and to lower the cost of production.

2. Description of the Prior Art

Laser is characterized in four kinds of natures, they are monochromatic, coherence and directionality and brightness, and especially suit processing of materials. Laser processing is of a field having most prosperous future in laser application; presently, there have been more than 20 kinds of laser processing techniques developed. Space and time controls of lasing are very good, these own very large freeness in control of the quality of material, shapes, sizes and the processing environment for processed objects; laser thereby suits especially automation processing. A laser processing system can be combined with a computer numerical control technique to construct automation processing equipment of high efficiency, such combined technique has been the key technique in timely production for enterprises and developed a broad prospect for production by processing with good quality, high efficiency and low cost.

Among them, especially the gas laser, must has a gas storage container in manufacturing for drawing out gas from the container with a drawing device, and an aeration device is used to fill the gas. Thereby, attention must be particularly paid in gas drawing/refilling, when there is no good auxiliary equipment, the connecting process for the gas drawing/refilling will be unable to help making the function of gas drawing/refilling in a sealed space, and defects that gas aerated may leak or air outside may intrude will result.

Since wide using of various laser tubes, one mode of gas drawing/refilling has been always highly thought of by manufacturers and users, and various gas drawing/refilling have been developed.

Now related domestic laser application techniques have been mature, but basic laser tubes are still directly imported, and are quite expensive. If the laser industry is to be further developed, manufacturers must produce the internal laser tubes by themselves to effectively lower the cost of them. And when gas laser equipment is to be manufactured, the auxiliary equipment for gas drawing/refilling must be necessary.

As shown in FIGS. 1 and 2, a gas drawing/refilling and sealing structure developed formerly by the inventor of the present invention is depicted, the structure assists a sealed container 1 for gas drawing/refilling. The container 1 is provided thereon with a screw hole 11 communicating with the interior of the container 1, so that the gas can be drawn out or injected into the container 1. The structure is comprised of a main body 2, a shaft 3 and a fixing member 4; the main body 2 is provided therein with an axial through hole 22 having a transverse through hole 23 provided thereon and communicating therewith for connecting with a tube 24. The main body 2 is attached to the container 1 for use; thereby the axial through hole 22 is right opposite to a screw hole 11 of the container 1 communicating with the interior of the container 1. The shaft 3 is provided thereon with a gasket 32 to thereby be inserted into the axial through hole 22 of the main body 2 in an air-tight state when in connecting; the other end of the shaft 3 is protruded out of the main body 2 and is provided on the front end thereof with a screw rod 21. The tailing end of the fixing member 4 is engaged with the shaft 3 and is provided on the front end thereof with a threaded portion 41; the fixing member 4 is placed in the main body 2 to block the container 1 after gas injection to form a sealed space for drawing out the gas and for removing after use.

During gas injection, a part of the shaft 3 and the fixing member 4 are placed in advance in the axial through hole 22 of the main body 2; by the fact that the front end of the shaft 3 is engaged with the tailing end of the fixing member 4, the front section of the main body 2 is correspondingly provided on the front end of the screw hole 11 communicating with the interior of the container 1; and the main body 2 is provided thereon with a plurality of screw holes for locking with a threaded member 25 to firmly connect the main body 2 with the container 1. At this time, the shaft 3 can be pulled rearwardly to communicate the transverse through hole 23 with the outside, thereby the gas in the container 1 can be drawn out along the tube 24 until the gas in the container 1 is drawn up to a vacuum state; then a laser gas mixture is injected, and the shaft 3 is rotated for forwarding when the gas is filled in to a full state to firmly lock the fixing member 4 onto the screw hole 11 of the container 1; and the main body 2 and the shaft 3 are removed when aeration is completed.

However, the above stated gas drawing/refilling and sealing structure has the following defects in other aspects although it can get the object and effect of drawing out gas:

1. The structure is added externally; the main body and the shaft are protruded out of the container, they must be removed after drawing out gas, and must by mounted on when in injection; these are time wasting during the process of repeated gas drawing/refilling, and can increase trouble for the workers.
2. The combination of the elements of the structure is complicated, the shaft and the fixing member are composed of plural small parts; these can increase the cost of production.

In view of the above stated, the present invention is provided to eliminate the defects of the gas drawing/refilling and sealing structure and to get the effect of drawing out gas.

SUMMARY OF THE INVENTION

The primary object of the present invention is to provide a gas drawing/refilling and sealing structure for a laser gas storage container suiting gas drawing/refilling equipment used in laser processing, of which the structure is composed of simplified elements to lower the cost of production, and to make its operation convenient, thereby to reduce the time of operation and increase the efficiency of working during gas drawing/refilling.

To get the above object, the gas drawing/refilling and sealing structure for a laser gas storage container of the present invention includes a sealed container and a blocking member, wherein the body of the container is provided with a gas passage having a gas inlet end and a blocking end. The gas passage is further provided with a communicating section to make connection of the gas passage to the container. The blocking member is mounted on the blocking end, gas is drawn out of or injected into the container via the gas inlet end when the gas inlet end is opened; the gas is cut off when the gas inlet end is closed, and the container is sealed at the same time. Thereby, manufacturing and test of the laser equipment can be more convenient, and the superiority of the products can be increased.

The present invention will be apparent in its features and structure after reading the detailed description of the preferred embodiment thereof in reference to the accompanying drawings.

DETAILED DESCRIPTION OF THE PREFERRED EMBODIMENT

Figure 1:
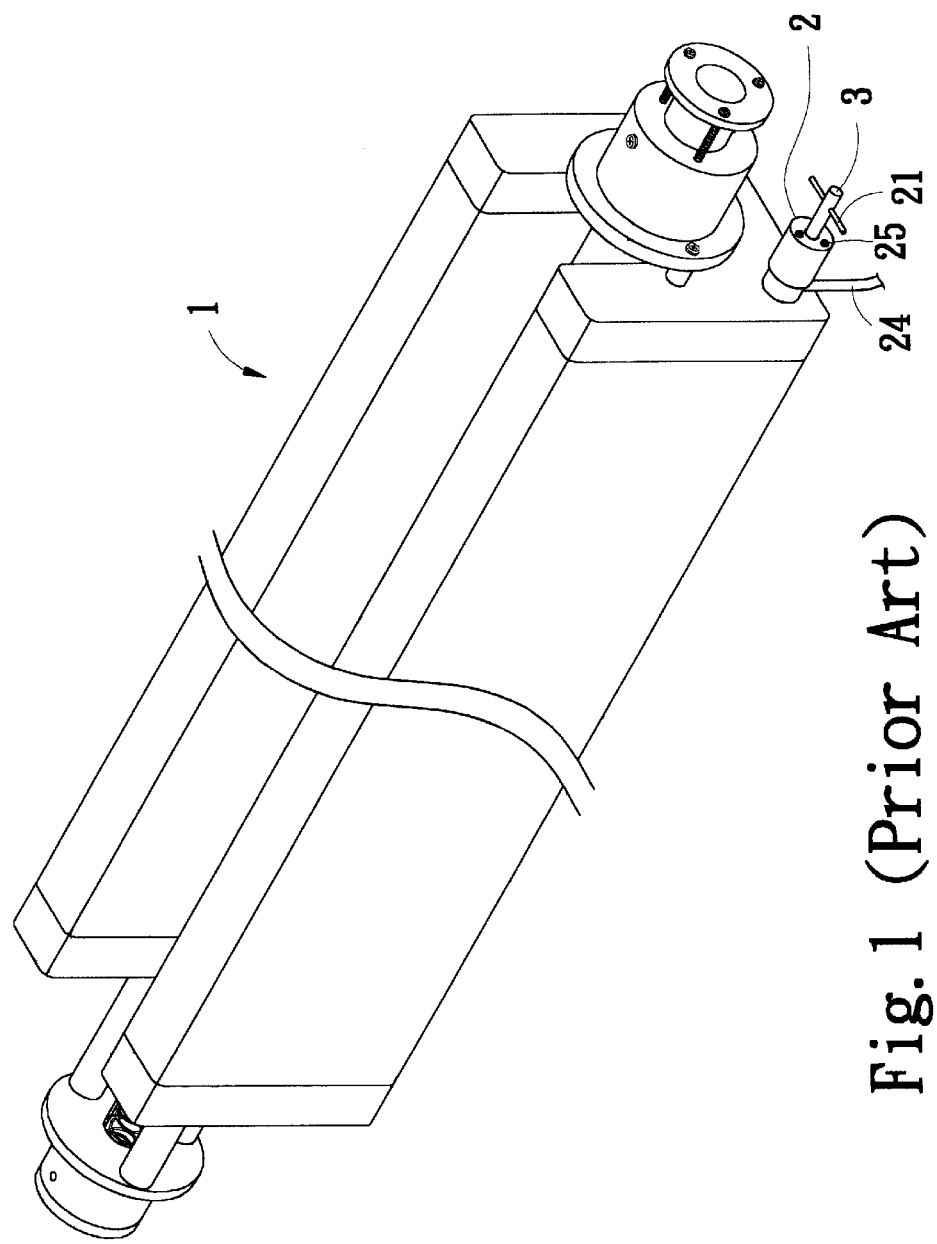
FIG. 1 is a perspective view of a conventional gas drawing/refilling and sealing structure.
Figure 2:
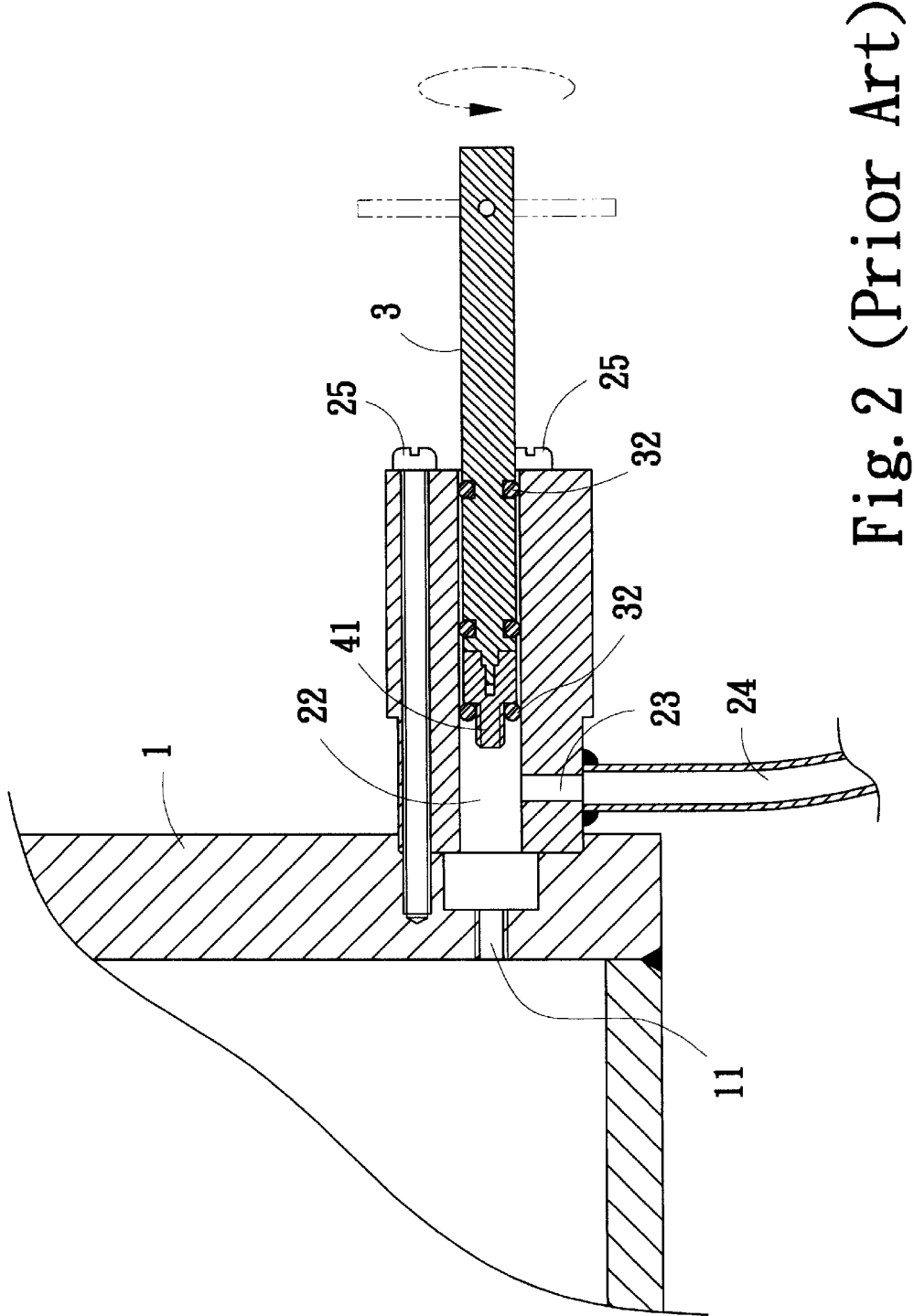
FIG. 2 is a sectional schematic view of a conventional gas drawing/refilling and sealing structure.
Figure 3:
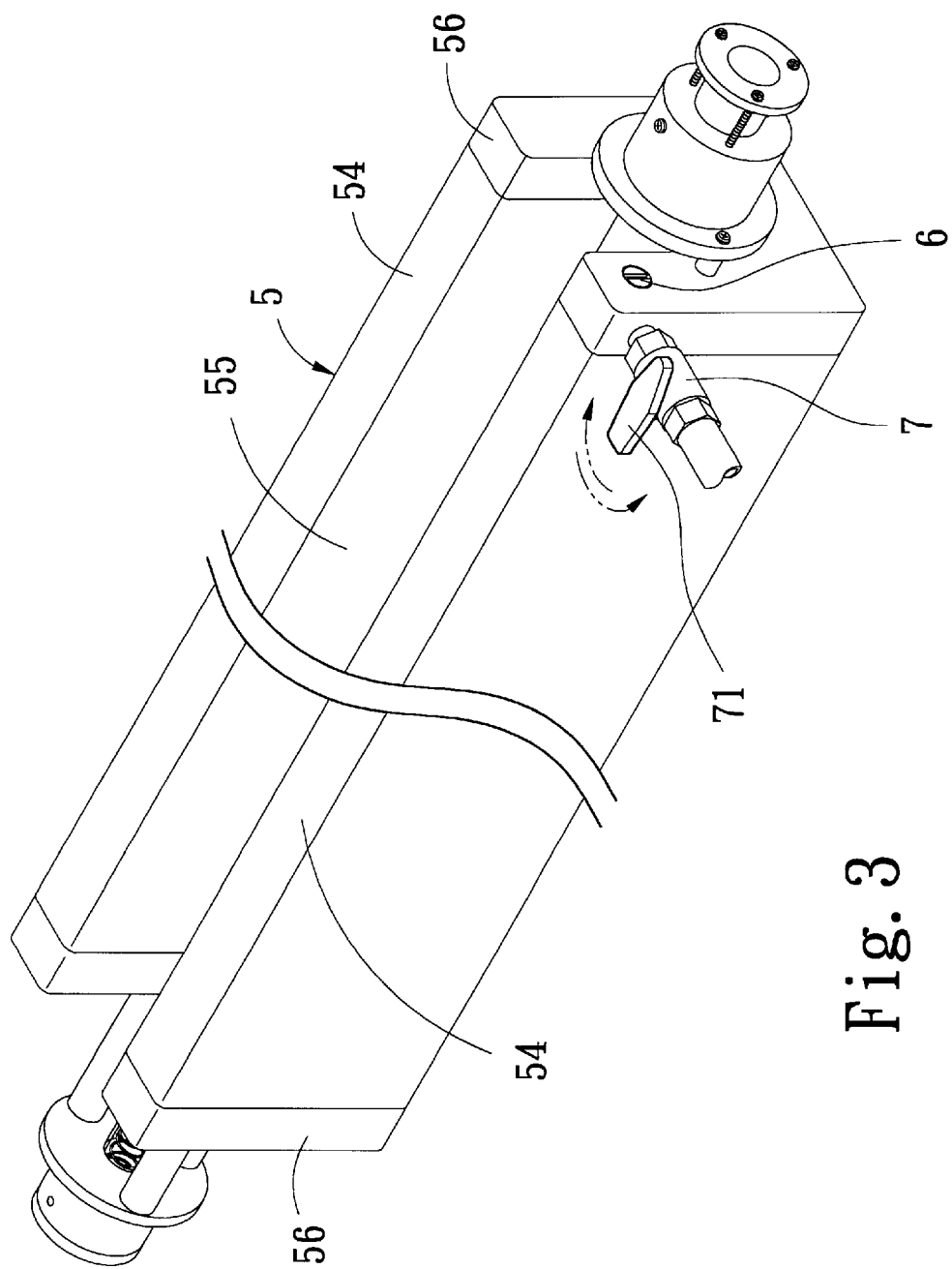
FIG. 3 is a perspective view of the gas drawing/refilling and sealing structure for a laser gas storage container of the present invention.
Figure 4:
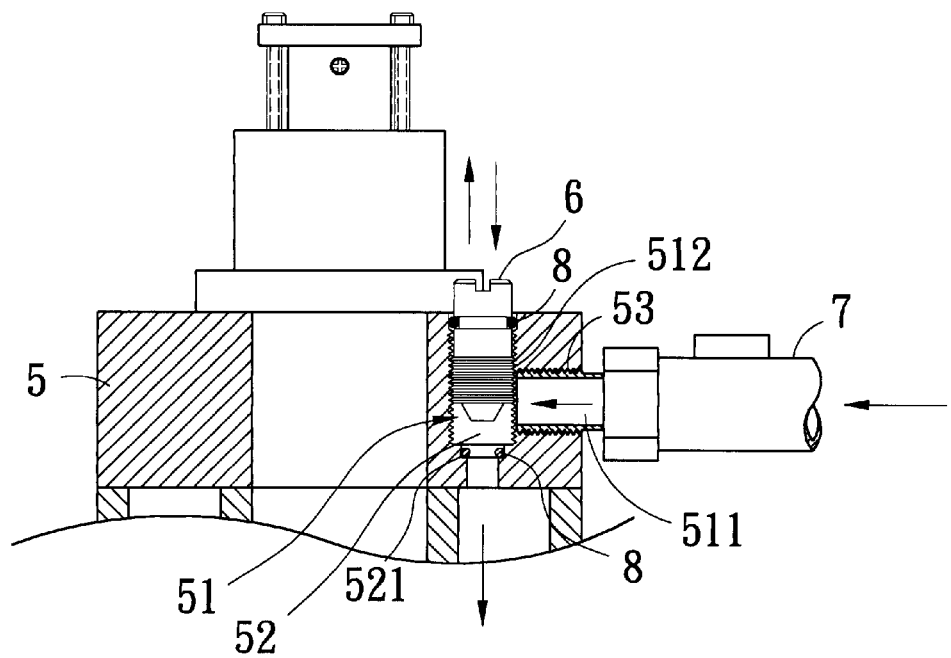
FIG. 4 is a sectional schematic view of the gas drawing/refilling and sealing structure for a laser gas storage container of the present invention when in gas drawing and injecting.
Figure 5:
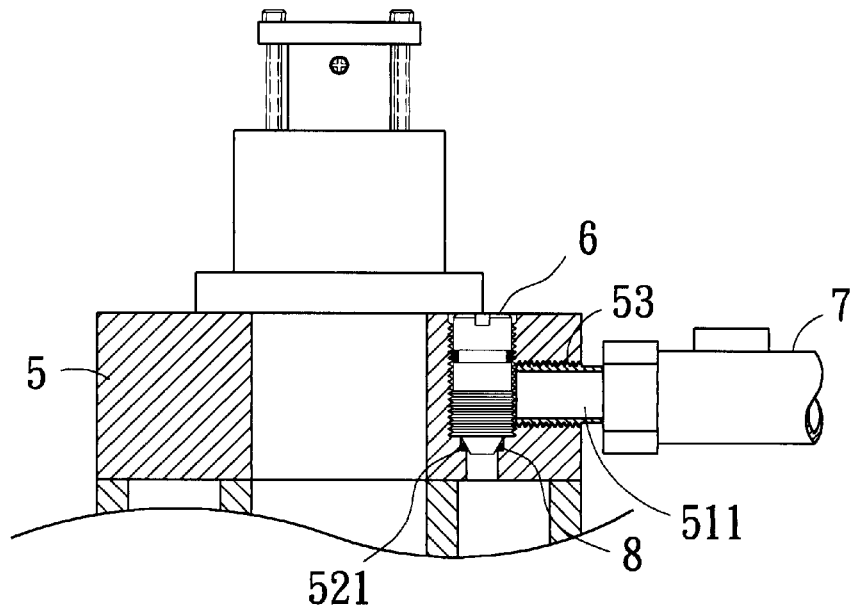
FIG. 5 is a sectional schematic view of the gas drawing/refilling and sealing structure for a laser gas storage container of the present invention when in blocking.

Referring firstly to FIGS. 3–5, the gas drawing/refilling and sealing structure shown in the drawings is a preferred embodiment of the present invention; it is comprised of a sealed container 5 and a blocking member 6 (such as a screw).

Wherein the sealed container 5 has a barrel 54; the barrel 54 has in the middle thereof a recess 55 for receiving a tube, and have on the two ends thereof end covers 56 with a notch thereon each. The body of the container 5 is provided on the end cover 56 of one end of the barrel 54 with a gas passage 51; the gas passage 51 has a gas inlet end 511 and a blocking end 512. The gas passage 51 is further provided with a communicating section 52 to make connection of the gas passage 51 to the container 5; the communicating section 52 is located on the inner surface of the end cover 56 of the aforesaid one end of the barrel 54. The blocking end 512 is provided on the outer surface of this end cover 56, while the gas inlet end 511 is provided on the end face of this end cover 56.

The gas inlet end 511, the blocking end 512 and the communicating section 52 are channels each in a "T" shape. The gas passage 51 is provided therein with a thread 53, so that the gas inlet end 511 can be movably and pivotally connected with a pipeline 7 that is communicated with the equipment for gas drawing/refilling. The pipeline 7 is provided therein with a control valve 71 to control a switch of the pipeline 7. The communicating section 52 is provided on the end thereof with a through hole 521 having a reduced diameter, a gasket 8 is provided on a stepped portion of the through hole 521. The blocking member 6 is pressed against the gasket 8 by screwing in to seal the container 5. The blocking member 6 is mounted on the blocking end 512 by screwing in; during screwing in, the blocking end is blocked up to make the gas inlet end 511 communicate with the interior of the container 5, so that gas is drawn out of or injected into the container 5; and the gas is cut off when the gas inlet end 511 is closed, and the container 5 is sealed at the same time. Thereby, the object and effect of gas drawing/refilling can be obtained.

As shown in FIGS. 4 and 5, during gas drawing and container sealing, firstly the gas is drawn out of the container 5 via the pipeline 7 pivotally connected with the gas inlet end 511 (at this time, the blocking member 6 is only mounted on the blocking end 512 which is not yet screwed up; but the gasket 8 provided on the blocking member 6 has been screwed into the blocking end 512) until the container 5 is in a vacuum state; then laser gas mixture is injected into the container 5, now the blocking member 6 mounted on the blocking end 512 by rotation is screwed into the gas passage 51 to block up the gas inlet end 511, and the gasket 8 of the through hole 521 having a reduced diameter provided on the end of the communicating section 52 is pressed by the screwed in the blocking member 6; further there is another gasket 8 provided on front end of the blocking member 6, hence the gas in the container 5 will not leak out, and the object of sealing the container 5 is achieved.

The present invention thereby has the following advantages and effects:

1. The present invention only needs one blocking member (such as a screw) for blocking rather than needs complicated elements for blocking as the conventional cases do; thereby, the present invention can reduce the cost of production and can get the effect of blocking.
2. The present invention largely reduces the time required for gas drawing/refilling. It is known from practicing that in gas drawing/refilling of the present invention, only the connecting members need to be released or screwed up rather than that other elements shall be added like the way done in the conventional cases. This not only can reduce the procedures and time required for operation by workmen, but also can get the effect of esthetic beauty of the appearance of the container.
3. The design of the structure of the present invention allows the pipeline for gas drawing/refilling to not be detached in the entire manufacturing process of laser equipment, gas drawing/refilling can be practiced at any time, the pipeline can be detached when the test equipment is completed and totally stable.

In conclusion, according to the description disclosed above, the present invention surely can get the expected object thereof to provide a gas drawing/refilling and sealing structure for a laser gas storage container of which the structure is composed of simplified elements to save working hours and to lower the cost of production.

Having thus described the technical process of my invention with high industrial value, what I claim as new and desire to be secured by Letters Patent of the United States are:

1. A gas drawing/refilling and sealing structure for a laser gas storage container, said structure comprises:
   a sealed container, the body of said container is provided with a gas passage having a gas inlet end and a blocking end; said gas passage is further provided with a communicating section to make connection of said gas passage to said container;
   a blocking member mounted on said blocking end, gas is cut off when said blocking member gets close to said blocking end for blocking, and said container is sealed at the same time.
2. The gas drawing/refilling and sealing structure for a laser gas storage container as in claim 1, wherein said gas inlet end, said blocking end and said communicating section are channels each in a "T" shape, and are provided therein each with a thread.
3. The gas drawing/refilling and sealing structure for a laser gas storage container as in claim 1, wherein said gas inlet end is movably and pivotally connected with a pipeline that is provided with a switch for controlling access of gas.

4. The gas drawing/refilling and sealing structure for a laser gas storage container as in claim 1, wherein said blocking member is a screw which is provided on the front end thereof with a gasket to prevent leakage of gas.

5. The gas drawing/refilling and sealing structure for a laser gas storage container as in claim 4, wherein said communicating section is provided on the end thereof with a through hole having a reduced diameter, a gasket is provided on a stepped portion of said through hole; said blocking member is pressed against said gasket by screwing in to seal said container.

6. The gas drawing/refilling and sealing structure for a laser gas storage container as in claim 1, wherein said communicating section is provided on the end thereof with a through hole having a reduced diameter, a gasket is provided on a stepped portion of said through hole; said blocking member is pressed against said gasket by screwing in to seal said container.

7. The gas drawing/refilling and sealing structure for a laser gas storage container as in claim 1, wherein said sealed container has a barrel, said barrel has in the middle thereof a recess for receiving a tube, and has on the two ends thereof two end covers with a notch thereon each; said gas passage is provided on an end cover at one end of said barrel, said communicating section is provided on the inner surface of said end cover, said blocking end is provided on the outer surface of said end cover, while said gas inlet end is provided on the end face of said end cover.

* * * * *